(12) United States Patent     (10) Patent No.:    US 12,583,553 B1

Gasiorowski et al.     (45) Date of Patent:    Mar. 24, 2026

(54) BICYCLE CRANKSET

(71) Applicants: Michal Kamil Gasiorowski, Andrychów (PL); Karolina Monika Gajecka, Andrychów (PL)

(72) Inventors: Michal Kamil Gasiorowski, Andrychów (PL); Karolina Monika Gajecka, Andrychów (PL)

( * ) Notice: Subject to any disclaimer, the term of this patent is extended or adjusted under 35 U.S.C. 154(b) by 0 days.

(21) Appl. No.: 19/030,932

(22) Filed: Jan. 17, 2025

(51) Int. Cl.
    *B62M 3/00*      (2006.01)

(52) U.S. Cl.
    CPC ..................................... *B62M 3/00* (2013.01)

(58) Field of Classification Search
    CPC .......................... B62M 3/00; B62M 2003/006
    See application file for complete search history.

(56) References Cited

U.S. PATENT DOCUMENTS

| | | | | |
|---|---|---|---|---|
| 2,384,139 | A | * | 9/1945 | Schwinn .................. B62M 3/00 |
| | | | | 74/594.7 |
| 5,566,590 | A | * | 10/1996 | Wan ........................... F16C 3/28 |
| | | | | 74/32 |

FOREIGN PATENT DOCUMENTS

| | | | | |
|---|---|---|---|---|
| EP | 0634319 | A2 * | 1/1995 | ............ F02B 75/048 |
| EP | 4311757 | A1 | 1/2024 | |
| FR | 2219051 | A2 * | 9/1974 | |
| KR | 20100136201 | A * | 12/2010 | .............. B62M 3/02 |
| WO | WO-2017164512 | A1 * | 9/2017 | .............. B62M 3/02 |

* cited by examiner

*Primary Examiner* — Adam D Rogers

(74) *Attorney, Agent, or Firm* — Rabin & Berdo, P.C.

(57) ABSTRACT

A bicycle crankset provided with two arms mounted on opposite sides of the support. Inside one of the arms, near the support, there is a cylindrical socket for the bolt ended on one side with a pin coupled with a socket provided in a non-rotating sleeve, around which the arm rotates to the right or left by any angle from 0° to 360°, and on the other side of the bolt, there is a flange in contact with the arm of the two-arm lever pivotally mounted on the axle, with the compression spring placed inside the cylindrical socket.

2 Claims, 3 Drawing Sheets

BICYCLE CRANKSET

BACKGROUND OF THE INVENTION

The present invention relates to a bicycle crankset intended for conventional bicycle riding, or abdominal muscle strengthening exercises. The Applicant is not aware of a bicycle that could, apart from normal riding, be used at the same time for exercises strengthening abdominal muscles.

BRIEF SUMMARY OF THE INVENTION

The objective of the invention is to provide a bicycle crankset mechanism that will make it possible improve the rider's physical fitness by engaging leg muscles and additionally abdominal muscles to ride a bicycle, and will allow easy reconversion of the crankset mechanism into a conventional mechanism.

A bicycle crankset provided with two arms mounted on opposite sides of a support, according to the invention, characterized in that, inside the end of one of the arms there is a cylindrical socket for a bolt ended on one side with a pin coupled with a socket provided in a sleeve around which the arm rotates to the right or left by any angle from 0° to 360°, while on the other side of the bolt, there is a flange in contact with an arm of a two-armed lever pivotally mounted on the axle, wherein a compression spring is placed inside the cylindrical socket. The pin preferably has a conical end located preferably in a conical sleeve socket.

BRIEF DESCRIPTION OF THE DRAWINGS

The object of the invention is presented in an illustrative embodiment, in which.

DETAILED DESCRIPTION OF THE INVENTION

Figure 1:
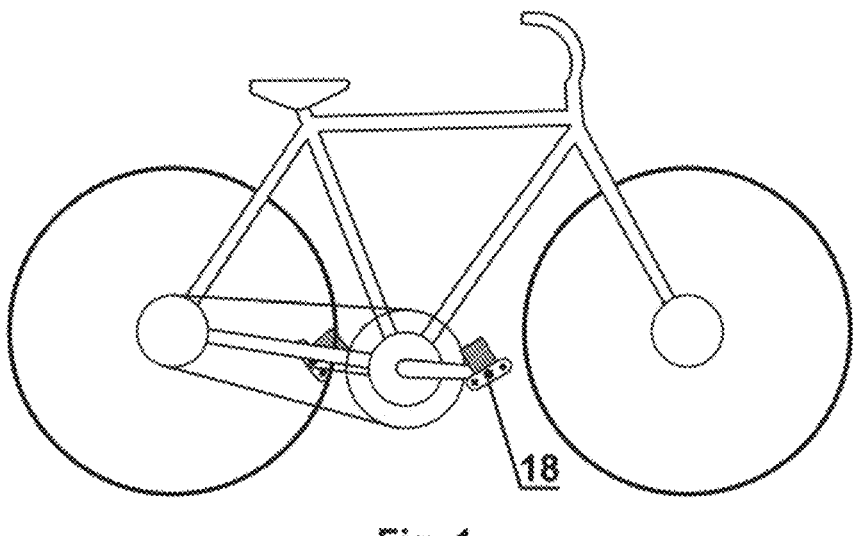
FIG. 1 shows a bicycle in which pedals are placed one after the other, as is the case in a conventional bicycle.
Figure 2:
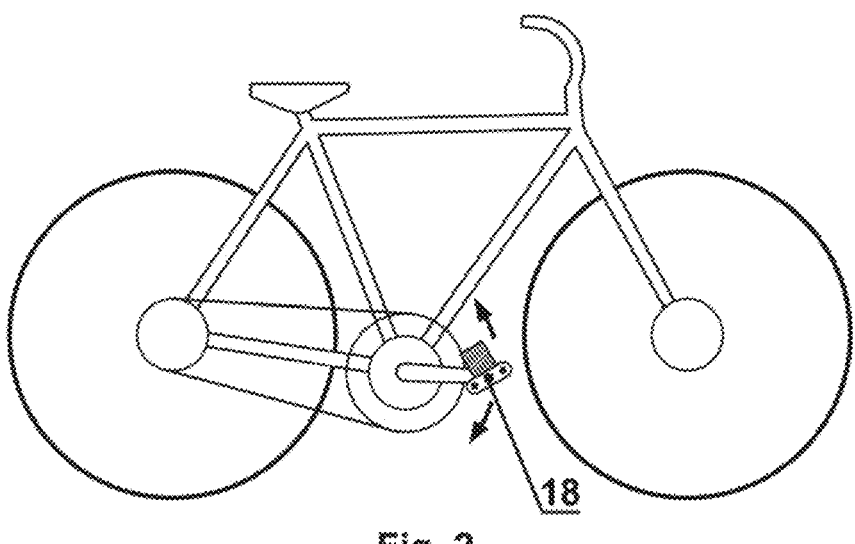
FIG. 2 shows a bicycle, in which pedals are placed opposite each other.
Figure 3:
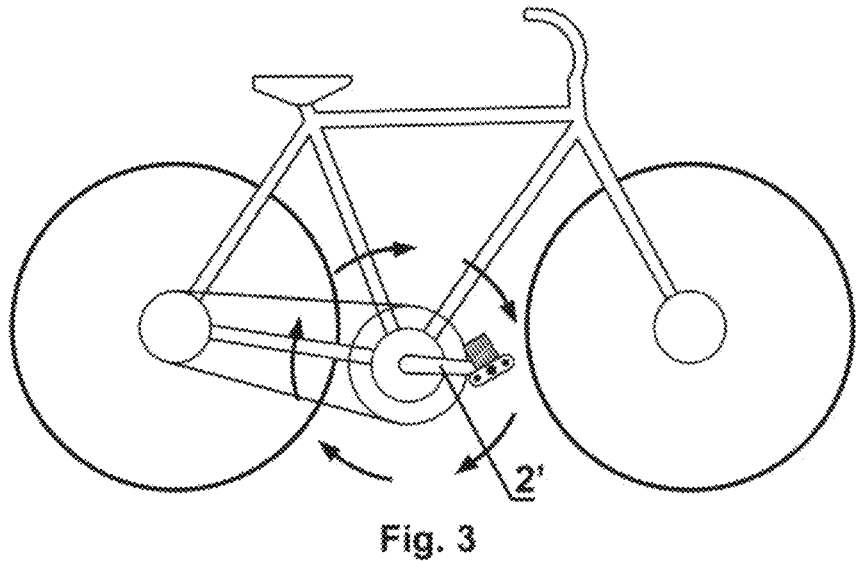
FIG. 3 shows a bicycle, in which pedals are placed opposite each other and can make a rotary motion around the support axle.
Figure 4:
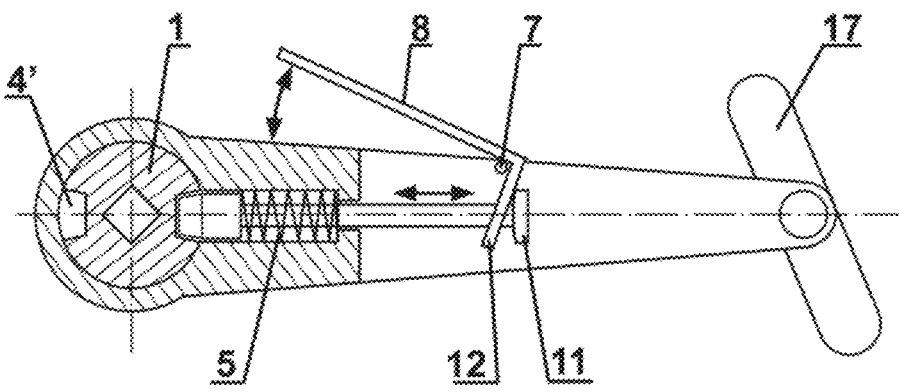
FIG. 4 is a longitudinal section and a view of a bicycle crank arm interlocked with the sleeve by means of a locking pin.
Figure 5:
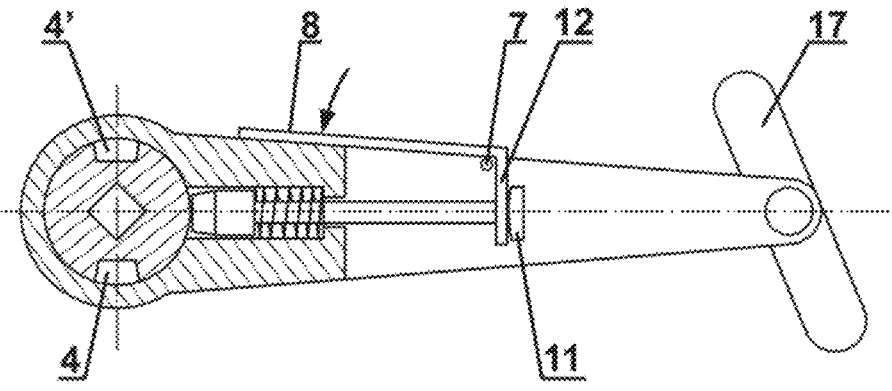
FIG. 5 is a longitudinal section and a view of the crank arm that is not interlocked with the sleeve by means of a locking pin.
Figure 6:
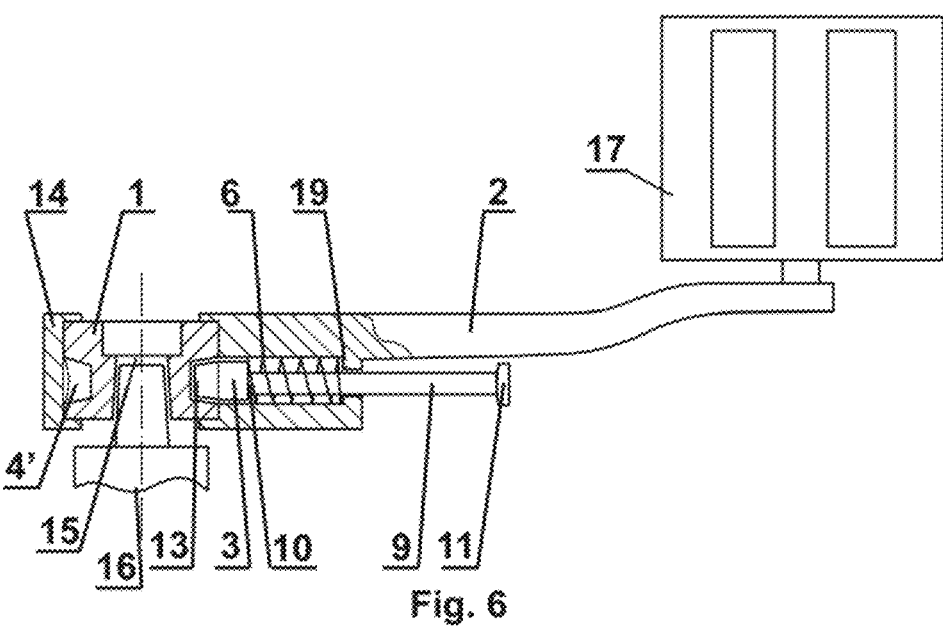
FIG. 6 is a cross-section and a view of a bicycle crank arm interlocked with the sleeve by means of a locking pin.

A bicycle crankset according to the invention is a substitute for a bicycle crankset commonly used today, and therefore is also used for conventional riding, and consists of two arms 2 and 2' mating with the support 16. In the end 14 of the rotating arms 2 or 2', there is a non-rotating sleeve 1 provided with a mounting hole 15 for the end of the support 16. On the circumference of the sleeve 1, on its opposite sides, there are two slots 4 and 4', preferably conical, which lock the position of the arm 2 or 2' for conventional riding based on the use of leg muscles, or for riding based on the use of leg muscles and abdominal muscles, wherein inside the end of one of the arms 2 or 2' there is a cylindrical socket 6 for the bolt 9, which ends on one side with a pin 3 with a conical end 13, whereas, on the other side of the bolt 9, there is a flange 11 in contact with the arm 12 of the two-armed lever 8 pivotally mounted on the axle 7. Between the surface 10 of the pin 3 and the surface 19 of the cylindrical socket 6, there is a compression spring 5, which is to ensure that the pin 3 presses the inside of the socket 4 or 4', which results in the engagement of one of the arms 2 or 2' of the bicycle crankset in one of the two sockets 4 or 4' provided in the sleeve 1 around which the arm 2 or 2' rotates to the right or left by any angle from 0° to 360°, or can lock its own position when rotating 180°, as a result of which, a parallel position of pedals 17, 18 is obtained.

In order to change the position of the arm 2 relative to the arm 2', pressure is put on lever 8 located on the axle 7, thanks to which the arm 12 moves the bolt 9 overcoming the resistance of the spring 5, which allows the narrowed conical part 13 of the pin 3 to slide out of the socket 4 of the sleeve 1. After the conical part 13 of the pin 3 slides out of the socket 4, the position of the crank 2 changes to the right or left. In this position, there is no longer any need to apply force to the lever 8 because the pin 3 slides over the outer surface of the sleeve 1 until it meets the second socket 4', and automatically, thanks to the pressure applied through the spring 5, it fixes its position in this socket.

The invention claimed is:

1. A bicycle crankset provided with two arms mounted on opposite sides of a support, characterized in that, inside one of the arms (2) or (2'), there is a cylindrical socket (6) for a bolt (9) ended on one side with a pin (3) coupled with a socket provided in a non-rotating sleeve (1), around which the arm (2) or (2') rotates to the right or left by any angle from 0° to 360°, and on the other side of the bolt (9), there is a flange (11) in contact with an arm (12) of a two-arm lever (8) pivotally mounted on an axle (7), with a compression spring (5) placed inside the cylindrical socket (6).

2. The bicycle crankset according to claim 1, characterized in that, the pin (3) has a conical end (13) placed in the socket provided in the non-rotating sleeve (1).

* * * * *